United States Patent [19]

Maida

[11] 3,971,053
[45] July 20, 1976

[54] ELECTROMAGNETIC TRIGGER DEVICE FOR USE WITH CAMERA CAPABLE OF AUTOMATIC TIME EXPOSURE

[75] Inventor: Osamu Maida, Tokyo, Japan

[73] Assignee: Nippon Kogaku K.K., Tokyo, Japan

[22] Filed: Jan. 23, 1975

[21] Appl. No.: 543,649

[30] Foreign Application Priority Data
Jan. 25, 1974 Japan.............................. 49-10089

[52] U.S. Cl.............................. 354/234; 352/121; 352/169; 352/174; 354/254
[51] Int. Cl.².................... G03B 9/08; G03B 17/26; G03B 21/38
[58] Field of Search .......... 352/176, 177, 169, 180, 352/121, 174, 136; 354/170, 171, 173, 234, 250, 254

[56] References Cited
UNITED STATES PATENTS

| | | | |
|---|---|---|---|
| 3,598,480 | 8/1971 | Kubota et al. ...................... | 352/169 |
| 3,603,678 | 9/1971 | Anderl et al. ...................... | 352/169 |
| 3,767,298 | 10/1973 | Reinsch .............................. | 352/169 |

*Primary Examiner*—L. T. Hix
*Assistant Examiner*—James LaBarre
*Attorney, Agent, or Firm*—Shapiro and Shapiro

[57] ABSTRACT

An electromagnetic trigger device for use with camera capable of automatic time exposure, comprises: a power supply; a motor; a trigger switch; shutter driving means driven by said motor for driving a shutter and movable between a fully closed position and a fully open position, said shutter driving means fully opening the shutter when it is at the fully open position and fully closing the shutter when it is at the fully closing position; engaging means movable between a latching position and a non-latching position, said engaging means being adapted, when moved to said latching position, to latch said shutter driving means which occupies one of the fully open and closing positions; a motor switch which is closed for electrically connecting said motor to said power supply, when said engaging means is in said non-latching position; a starting coil for attracting said engaging means, when energized, to move said engaging means to said non-latching position; a switching circuit for connecting said starting coil to said power supply when turned on; a starting capacitor connected to said power supply so as to be charged when said trigger switch is opened and connected to said switching circuit to render said circuit conductive when said trigger switch is closed; reset means for rendering said switching means non-conductive for a predetermined period during an interval beginning with the closing operation of said trigger switch, said predetermined lapse interval being shorter than the shorter of the time interval required for said shutter driving means to move from the fully closed position to the fully open position and the time interval required for said driving means to move from the fully open position to the fully closed position; and a charging circuit for charging said starting capacitor connected to said switching circuit after said reset means has turned off said switching circuit, said switching circuit being turned on when said starting capacitor is charged to a predetermined voltage by said charging circuit.

27 Claims, 13 Drawing Figures

ELECTROMAGNETIC TRIGGER DEVICE FOR USE WITH CAMERA CAPABLE OF AUTOMATIC TIME EXPOSURE

BACKGROUND OF THE INVENTION

1. Field of the Invention

This invention relates to an electromagnetic trigger device for use with a camera capable of automatic time exposure.

2. Description of the Prior Art

There has been proposed a cine camera of the type in which a motor is started by an electromagnet trigger device, which also controls the position at which a shutter is stopped, and a shutter driving mechanism for transporting a film and actuating a shutter mechanism is driven by the motor and which cine camera is further provided with a member for stopping the shutter at the position where the shutter is kept opened (to be referred to as the opened position) in order to attain the optimum exposure when a long exposure is required under the low or poor lighting condition such as the exposure at night or the microscopic photography, and a member for stopping the shutter at the position where the shutter is closed (to be referred to as the closed position hereinafter), whereby a long exposure may be attained by single frame exposure means for stopping the shutter in the opened position. The cine cameras of the type described are for instance disclosed in U.S. Pat. Nos. 3,721,492 and 3,722,989. However, with the system for permitting a long exposure of the type described in U.S. Pat. No. 3,721,492, when a release button is depressed for finishing a long time exposure, a shutter is closed, and the next frame is transported and successively the next exposure is initiated. Therefore, this exposure system is not advantageously adapted for use in, for instance, the microscopic photography for recording, for instance, the cell division or the growth of the crystal in which each frame must be exposed for a relatively long time, for instance 20 seconds, and the interval (to be referred to as the rest time hereinafter) between the successive two exposures must be also longer, for instance 5 minutes. The system disclosed in U.S. Pat. No. 3,722,989 is not advantageously adapted for use with conventional camera of the type operating on a battery because the system flows the current through an electromagnet for long exposure time. In both of the above systems, the exposure is manually made so that a user must operate the camera while measuring the exposure time and the rest time. Furthermore, it is very difficult for a non-skilled operator to set the optimum exposure time, and if the conditions are changed, a test exposure must be made. Thus both of the above systems are inconvenient in practice.

SUMMARY OF THE INVENTION

In view of the above, one of the objects of the present invention is to provide an electromagnet trigger device for use with a camera which permits not only the automatic time exposure mode but also the manual time exposure mode in which the desired exposure time and the rest time may be suitably selected by depressing a release button. Another object of the present invention is to provide an electromagnet trigger device for use with a camera wherein the exposure time as well as the rest time may be arbitarily selected even in the automatic time exposure mode. A further object of the present invention is to provide an electromagnet trigger device of the type described which may further attain automatically the optimum exposure time.

The present invention will become more apparent from the following description of the preferred embodiments thereof taken in conjunction with the accompanying drawings.

DESCRIPTION OF THE PREFERRED EMBODIMENTS

Figure 1:
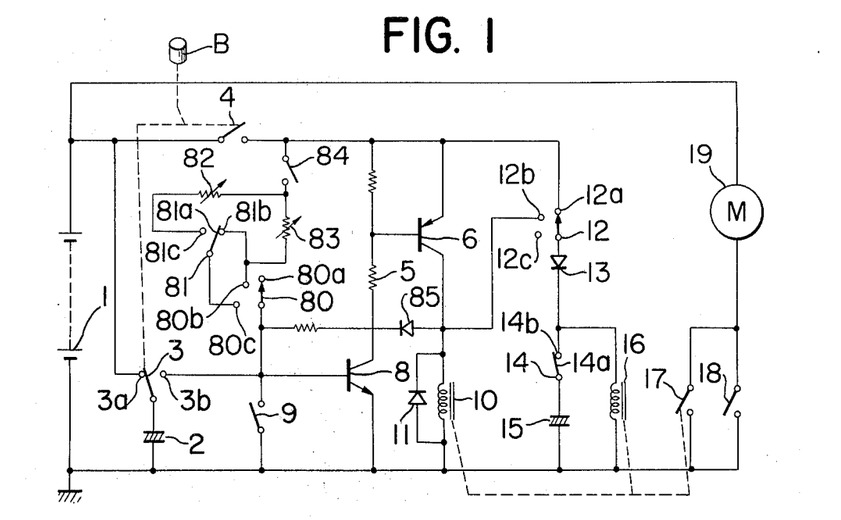
FIG. 1 is a circuit diagram of a first embodiment of the present invention.

Referring first to FIG. 1, reference numeral 1 denotes a power source; 2, a starting capacitor; and 3, a first trigger switch with two stationary contacts 3a and 3b and ganged or interlocked with a second trigger switch 4 and operatively coupled to a shutter release button B of a camera (not shown). When the release button B is depressed; that is, in case of the operation, the first trigger switch 3 shifts from the contacts 3a to the contact 3b while the second trigger switch 4 is also closed. When the release button is released; that is, in case of the interruption of the shutter driving mechanism, the first trigger switch 3 returns the contact 3a while the second trigger switch 4 is opened.

A resistor 5, a pnp transistor 6, a diode 85 for preventing the reverse current, a resistor 7 and an npn transistor 8 make up a positive feedback circuit which functions as an SCR having two stable states. The base of the transistor 8 is connected to the stationary contact 3b of the first trigger switch 3. When the first trigger switch 3 opens the stationary contact 3a connected to the power source 1 and closes the contact 3b, the starting capacitor 2 discharges so that the base current flows into the transistor 8. As a result, both the transistors 6 and 8 are triggered into the conduction state. The base of the transistor 8 is also connected to a reset switch 9 which is normally opened when the camera operation is interrupted. A trigger or starting electromagnet coil 10 is interconnected between the collector of the transistor 6 and the negative terminal of the power supply 1. A diode 11 is connected in parallel with the coil 10 so that the counterelectromotive force induced across the coil 10 may be absorbed so as to prevent it from adversely affecting the operations of other component parts. An exposure mode selection switch 12 has three stationary contacts 12a, 12b and 12c. When the contact 12a is closed, the continuous exposure mode is selected; when the contact 12b is closed, the single frame exposure mode is selected; and when the contact 12c is closed, the time exposure mode is selected as will be described in detail hereinafter. The stationary contact 12a is connected through the second trigger switch 4 to the positive terminal of the power source 1; the contact 12b, to the collector of the transistor 6; and the contact 12c is opened. A diode 13 for preventing the reverse current, a timing switch 14, and a capacitor 15 are interconnected between the exposure mode selection switch 12 and the negative terminal of the power supply 1. An electromagnet coil 16 for holding an armature is interconnected between the junction between the diode 13 and the stationary contact 14b of the timing switch 14 and the negative terminal of the power source 1. The windings of the coils 10 and 16 are so designed that a large current may flow through the coil 10 in order to attract the armature 32b while a small current may flow through the coil 16 in order to keep attracting the armature 32b. A motor switch 17 is so arranged that when an engaging lever 32 to be described in more detail hereinafter is released by the energization of the electromagnet, the switch 17 may be closed, thereby controlling a DC motor 19 connected in series to the motor switch 17. Preferably, a phase switch 18 may be connected in parallel with the motor switch 17 so as to control a shutter driving mechanism to be described in more detail hereinafter. For the sake of explanation in conjunction with FIG. 2, the negative terminal of the power supply 1 is shown as being grounded to a camera body.

A selection switch 80 has three stationary contacts 80a, 80b and 80c and is interlocked with the selection switch 12 in such a way that when the stationary contact 12a of the selection switch 12 is closed, the contact 80a of the selection switch 80 is closed; when the contact 12b is closed, the contact 80b is also closed; and when the contact 12c is closed, the contact 80c is closed. A time constant selection switch 81 has two stationary contacts 81b and 81c either of which is selectively closed by a movable contact 81a. As will be described in detail hereinafter, when the shutter or the shutter driving mechanism is stopped at the closed position, the movable contact 81a closes the stationary contact 81b while the shutter or the shutter driving mechanism is stopped at the opened position, the movable contact 81a closes the stationary contact 81c.

A variable resistor 82 has a function of integrating for determining the exposure time in time photography while a variable resistor 83 has a function of integrating for determining the rest time or interval. The power supply 1 and the variable resistor 82 or 83 make up a charging circuit. An automatic-manual exposure mode selection switch 84 selects the automatic exposure mode when it is closed and selects the manual exposure mode when opened.

Next referring to FIG. 2, a mechanism operatively coupled to the circuit shown in FIG. 1 will be described. A reduction gear 21 made of an electrically conductive material and carried by a main connecting and driving shaft 22 made of an electrically conductive material is in mesh with a driving gear 20 attached to the driving shaft of the DC motor 19. A rotary shutter 23 is carried by the main driving shaft 22. The exposure of film is made through an exposure aperture or window 24 and the rotary shutter 23. In synchronism with one rotation of the reduction gear 21, the opening and closing of the rotary shutter and the transport of the film by one frame by means of film transport means (not shown) may be effected. The driving gear 20, the reduction gear 21 and the main driving shaft 22 constitute the shutter driving mechanism.

The movable contacts of the reset switch 9 and phase switch 18 are made into contact with the side surface of the reduction gear 21. The distance between the movable contact 9 and the center of the reduction gear 21 are different from that between the movable contact 18 and the center of the reduction gear 21. Insulating plates 25a and 25b are attached on circumference of the reduction gear 21 which is contacted with the movable contact of the phase switch 18 and in the symmetrical relation about the center of the reduction gear 21. In like manner, insulation plates 26a and 26b are attached on circumference of the reduction gear 21 which is contacted with the movable contact of the reset switch 9 and in the symmetrical relation about the center of the reduction gear 21. Thus the phase switch 18 is made up of the movable contact and the insulating plates 25a and 25b attached on the side surface of the reduction gear 21, and is closed and opened as the reduction gear 21 rotates. In like manner, the reset switch 9 is made up of the movable contact and the insulating plates 26a and 26b, and is closed and opened as the reduction gear 21 rotates.

Figures 5, 6:
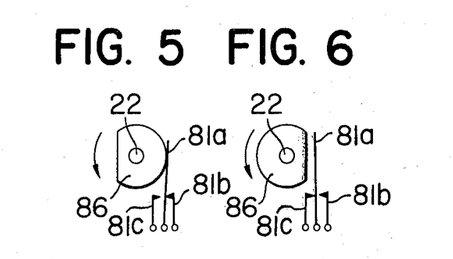

A first cam 29 made of an insulating material and carried by the main driving shaft 22, the movable contact 14a resiliently pressed against the cam surface of the first cam 29, and the stationary contact 14b make up the timing switch 14 which is opened and closed as the first cam 29 rotates in unison with the reduction gear 21. As shown in FIG. 5, a second cam 86 made of an insulating material is carried by the main driving shaft 22, and makes up the time constant selection switch 81 together with the movable contact 81a, and the stationary contacts 81b and 81c. Therefore the time constant selection switch 81 is actuated as the cam 86 rotates.

Extended from the side surface of the reduction gear 21 are a first stop 27 for stopping the shutter or the shutter driving mechanism at the closed position and a second stop 28 for stopping the shutter or the shutter driving mechanism at the opened position. An engaging lever 32 made of an electrically conductive material is pivoted with a pivot pin 33, and has a pawl 32a formed at one end thereof for engagement with the stop 27 or 28 and the armature 32b formed or attached at the other end thereof. The engaging lever 32 is biased by a spring 34 made of an electrically conductive material and grounded in such a way that the pawl 32a may be normally kept in engagement with the stop 27 or 28. As described before, the spring 34 is grounded so that the engaging lever 32 is also grounded or is held at the ground potential.

A core 35 is common both to the first and second magnet coils 10 and 16. When the coil 10 is energized, the core 35 attracts and holds the armature 32b against the spring 34 so that the engaging lever 32 is caused to rotate in the clockwise direction. As a result, the pawl 32a of the engaging lever 32 is released or moved away from the stop 27 or 28 so that the rotation of the reduction gear 21 is permitted and the engaging lever 32 is made into contact with the movable contact of the motor switch 17. Therefore the switch 17 is closed so that the motor 19 is energized.

Figure 3:
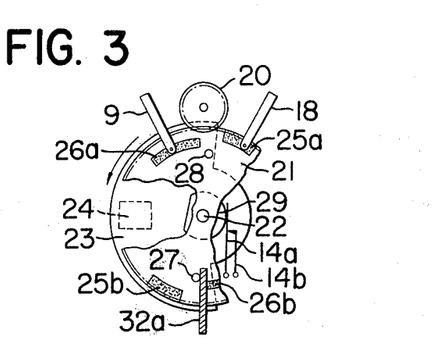
FIGS. 3, 4, 5 and 6 are views used for the explanation of the mode of operation of the first embodiment.
Figure 4:
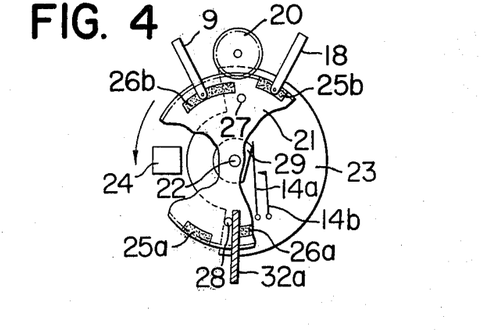

FIGS. 3 and 4 are the side views looking the side surface of the reduction gear 21 where the first and second stops 27 and 28 are provided, the reduction gear being partly broken away. From these figures, the phase relationship among the switches may be clearly seen. That is, in FIG. 3, the pawl 32a is shown as being in engagement with the first stop 27 for positioning the shutter or the shutter driving mechanism at the closed position while in FIG. 4 the pawl 32a is shown as being in engagement with the second stop 28 for stopping the shutter at the open position. The reduction gear 21 is rotated in the direction indicated by the arrows.

The mode of operation of the time constant selection switch 81 may be well understood with reference to FIGS. 5 and 6. That is, in FIG. 5, the movable contact 81a is pressed against the raised cam surface of the cam 86 with the engaging lever 32 or its pawl 32a engaged with the first stop 27 so that it is made into engagement with the stationary contact 81b. In FIG. 6, the engaging lever 32 or its pawl 32a is in engagement with the second stop 28, and the movable contact or contact arm 81a is opposed to the cut-away or flat cam surface of the cam 86 so that it is made into engagement with the stationary contact 81c.

Figure 7:
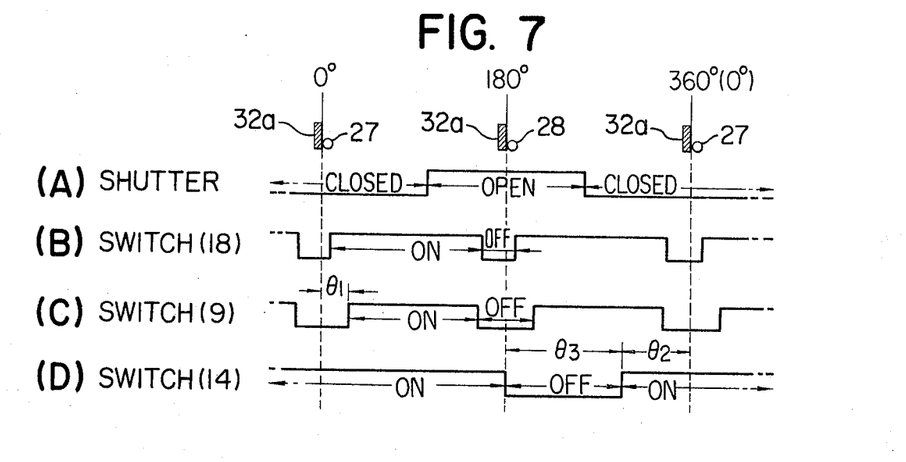
FIG. 7 is a phase chart used for the explanation of the relationship among the switches of the first embodiment.

FIG. 7 is a chart for illustrating the phase relationship among the shutter, and the switches 18, 9 and 14 when the reduction gear 21 is rotated from the reference point or 0° at which the pawl 32a of the engaging lever 32 is made into engagement with the first stop 27.

Next the continuous exposure mode in which the contact 12a of the mode selection switch 12 and the stationary contact of the selection switch 80 are closed will be described. Since the movable contact of the selection switch 80 is made into engagement with the stationary contact 80a which is free, the switch 84, the resistors 83 and 82, and the selection switch 81 will not cause any effect on other circuits. When the shutter release button B is closed with the pawl 32a engaging with the first stop 27 as shown in FIGS. 2 and 3, the second trigger switch 4 is closed while the movable contact of the first trigger switch 3 shifts from the stationary contact 3a to the stationary contact 3b. As a result, the starting capacitor 2 discharges so that the base current flows into the transistor 8. The positive feedback circuit made up of the transistors 6 and 8 is driven into the conduction state. Since the transistor 6 is turned on, the current flows through the starting coil 10 so that the core 35 is energized, attracting the armature 32b. The engaging lever 32 is therefore caused to rotate in the clockwise direction. The current also flows through the second or holding coil 16 through the selection switch 12 and the diode 13 so that the coil 16 is kept energized. As shown by (d) in FIG. 7, the timing switch 14 is closed so that the capacitor 15 is charged through the diode 13. Since the forward resistance of the diode 13 is very low, the capacitor 15 is immediately charged.

As the armature 32b is attracted by the core 35, the pawl 32a is separated from the first stop 27 so that the motor switch 17 is closed. Therefore the motor 19 starts running so that the reduction gear 21 rotates. When the reduction gear 21 rotates through an angle $\theta_1$, the reset switch 9 is closed as shown by (c) in FIG. 7 so that the base and emitter of the transistor 8 are short-circuited. Thus, the transistor 8 is turned off so that the transistor 6 is also turned off and the terminals of the capacitor 2 are short-circuited. Therefore the capacitor 2 is discharged so that the transistors 6 and 8 will not be turned on even when the reset switch 9 is opened again.

Therefore no current flows through the starting coil 10, but the small current flows through the holding or second coil 16 so that the core 35 keeps attracting the armature 32b. As a result, as long as the second trigger switch 4 remains closed, the rotation of the motor 19 may be permitted so that the continuous exposure may be carried out.

When release button B is released in order to interrupt the continuous exposure, the movable contact of the first trigger switch 3 is changed over from the stationary contact 3b to the contact 3a while the second trigger switch 4 is opened. No current is supplied from the power supply 1 to the holding coil 16. In general, an operator does not take into consideration the shutter release button releasing timing; that is, the position of the pawl 32a with respect to the first or second stop 27 or 28 when he releases the release button B. Therefore some contingency governs whether the pawl 32a engages with the first stop 27 namely the shutter is stopped in the closed position, or the pawl 32a engages with the second stop 28 namely the shutter is stopped in the opened position. However, according to the present embodiment, this problem is solved because when the pawl 32a is in the particular phase relation with the first or second stop 27 or 28, the engaging lever 32 is caused to return by the capacitor 15 and the timing switch 14 in such a way that the pawl 32a may be always made into positive engagement with the first stop 27 for stopping the shutter in the closed position as will be described in detail hereinafter. As shown by (d) in FIG. 7, the timing switch 14 is opened from 180° position to (180°+$\theta_3$) position, but the closed in the other phase angle. The angle $\theta_2$ is provided in order to compensate sufficiently the time interval required for the pawl 32a of the engaging lever 32 to engage with the first stop 27 or the second stop 28 after it has been released from the core 35. The capacitance of the capacitor 15 is so selected that the discharge current flowing from the capacitor 15 through the coil 16 maintains the core 35 attracting the armature 32b for a longer time required for the reduction gear 21 to rotate through the angle (360° − $\theta_3$). When the release button B is released within the range of relative position indicated by $\theta_3$ shown in FIG. 7, the second trigger switch 4 and the timing switch 14 are being opened so that no current flows into the holding coil 16. Therefore the pawl 32a is free; that is, the engaging lever 32 is not attracted by the core 35 so that the motor switch 17 is opened, but the phase switch 18 inserted in parallel with the motor switch 17 is kept closed. Consequently, the motor 19 is driven until the pawl 32a engages with the first stop 27, and thereafter the phase switch 18 is opened to deenergize the motor 19 so that engagement of the pawl 32a and the first stop 27 stops the shutter driving mechanism. Thus the shutter is stopped at the closed position. During the phase angle $\theta_2$, the timing switch 14 is closed, but the holding coil 16 produces the force sufficient only for keep attracting the armature 32b and cannot attract again the engaging lever 32 which has been already separated from the core 35 and rotated in the counterclockwise direction under the force of the biase spring 34. Therefore even when the current flows into the holding coil 16 due to the discharge of the capacitor 15, the engaging lever 32 will not be attracted by the holding coil 16 within the range of $\theta_2$.

When the release button B is released during the phase angle except $\theta_3$ shown in FIG. 7, the second trigger switch 4 is opened so that no current flows from the power supply 1 into the holding coil 16. However, the timing switch 14 is closed and the capacitance of the capacitor 15 is selected as described before, the current due to the discharge of the capacitor 15 flowing through the holding coil 16 maintains the core 35 attracting the armature 32. When the timing switch 14 is opened; that is, when the reduction gear 21 reaches the relative angular position 180° shown in FIG. 7, the flow of the current through the holding coil 16 is interrupted by opening of the timing switch 14 so that the engaging lever 32 is released from the core 35; that is, the pawl 32a returns. However, the second stop 28 has already passed the pawl 32a so that the pawl 32a cannot engaged with the second stop, but is engageable only with the first stop 27. The motor switch 17 is open, but the phase switch 18 is closed so that the motor 19 is driven until the pawl 32a engages with the first stop 27, and thereafter the phase switch 18 is opened to deenergize the motor 19 and the shutter driving mechanism is stopped by engagement of the pawl 32a and the first stop 27. Thus the shutter is always stopped at the closed position. It should be noted that when the timing switch 14 is closed within the phase angle $\theta_2$, it will not cause any effect on the operation of the engaging lever 32. In the foregoing description, even when the phase switch 18 is opened for a short time at the phase angle of 180°, the reduction gear 21 keeps its rotation due to its inertia, and when the phase switch 18 is closed again, the motor 19 is energized and kept rotating.

Next the single frame exposure mode will be described. In the single frame exposure mode, the contacts 12b and 80b of the mode selection switch 12 and the selection switch 80 are closed. In case of the manual operation in which the switch 84 is opened, the resistors 82 and 83, and the selection switch 81 take no part in the operation of the circuit.

When the shutter release button B is depressed with the pawl 32a engaging with the first stop 27, the movable contact of the first trigger switch 3 is changed over from the contact 3a to the contact 3b, while the second trigger switch 4 is closed. The starting capacitor 2 turns on the transistors 6 and 8 and the current flows through the starting coil 10 in the manner described above. Since the contact 12b of the selection switch 12 is closed, the capacitor 15 is charged through the transistor 6, the selection switch 12, the diode 13 and the timing switch 14, and the current flows through the holding coil 16. As the starting coil 10 is energized, the core 35 attracts the armature 32b so that the pawl 32a is separated from the first stop 27. The motor switch 17 is closed so that the motor 19 is started. When the reduction gear 21 which is rotated by the motor 19 rotates through the angle $\theta_1$ as shown in FIG. 7, the reset switch 9 is closed so that the transistors 6 and 8 are turned off. Since the forward resistance of the diode 13 is low, the charging time of the capacitor 15 is very short and is completed before the reduction gear 21 rotates through the angle $\theta_1$. Since the transistor 6 is turned off, no current flows into the starting coil 10. The timing switch 14 is however closed as shown by (d) in FIG. 7 and the capacitance of the capacitor 15 is selected in the manner described hereinbefore so that the discharge current from the capacitor 15 flows through the timing switch 14 into the holding coil 16. Therefore, the armature 32b is kept attracted by the core 35. Since the discharge current from the capacitor 15 is prevented by the diode 13, it is not permitted to flow through the resistor 7. When the reduction gear 21 reaches the 180° position as shown in FIG. 7, the current to the holding coil 16 is interrupted by opening of the timing switch 14 so that the armature 32b is released and the pawl 32a is rotated in the counterclockwise direction under the force of the spring 34. However, the second stop 28 has already passed over the pawl 32a, it will not engage therewith. The motor switch 17 is opened as the pawl 32a is rotated in the manner described above, but the phase switch 18 is closed so that the motor 19 is driven until the pawl 32a engages with the first stop 27. Thereafter, the phase switch 18 is opened to deenergize the motor 19 and the shutter driving mechanism 20, 21, 22 is stopped by engagement of the pawl 32a and the stop 27. Under these conditions, even when the release button B is kept depressed, no exposure will be made. However, when the release button B is released and depressed again, the reduction gear makes one rotation so that the shutter is stopped at the closed position in the manner described hereinabove. Thus everytime when the release button B is depressed, the reduction gear 21 makes one rotation so that one frame of the film is exposed and thereafter the film is transported by one frame; that is, the single frame exposure is made.

Next the automatic single frame exposure mode in which the switch 84 is closed will be described. In this mode, the variable resistor 83 takes a part in the operation as will be described hereinafter. When the release button B is depressed, the coil 10 is energized in the manner described hereinbefore so that the pawl 32a engages with the first stop 27 after one frame has been exposed in the manner described hereinbefore. However when the release button B is kept depressed, the starting capacitor 2 which has been already discharged through the reset switch 9 is charged again through the variable resistor 83 and the switch 80 whose contact 80b is closed when the reset switch 9 is opened. After a predetermined time; that is, when the voltage across the starting capacitor 2 exceeds the threshold voltage between the base and emitter of the transistor 8, both the transistors 6 and 8 are turned on to energize the starting coil 10 so that the engaging lever 32 is disengaged from the stop 27. As a result, the reduction gear 21 is rotated, and the transistors 6 and 8 are turned off by the reset switch 9. The starting capacitor 2 is discharged, and under the operation of the timing switch 14 and the capacitor 15, the pawl 32a of the engaging lever 32 engages with the first stop 27 to stop the shutter driving mechanism. Thereafter the capacitor 2 is charged again through the variable resistor 83 in the manner described above. Thus as long as the release button B is kept depressed, the signal frame exposure is automatically cycled at a predetermined time interval which is dependent upon the resistance of the rest time setting variable resistor 83, the electrostatic capacitance of the starting capacitor 2, and the threshold voltage of the transistor 8.

Next the time exposure mode will be described in which the stationary contact 12c of the exposure mode selection switch 12 and the stationary contact 80c of the selection switch 80 are closed. In case of the manual exposure in which the switch 84 is opened, the selection switch 81 takes no part in the operation.

Figure 2:
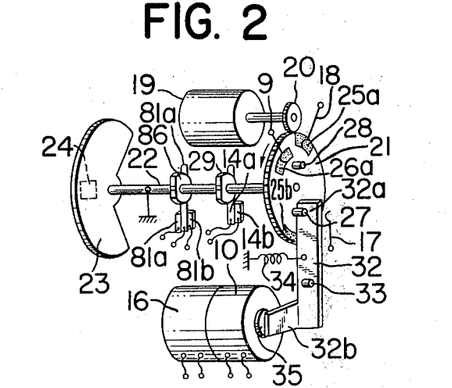
FIG. 2 is a perspective view of a mechanical mechanism thereof.

When the shutter release button B is depressed with the pawl 32a engaging with the first stop 27 as shown in FIGS. 2 and 3, the contact 3a of the first trigger switch 3 is opened while the contact 3b is closed, and the second trigger switch 4 is closed. The starting capacitor 2 turns on both the transistors 6 and 8, thereby energizing the starting coil 10 in the manner described hereinbefore. Since the stationary contact 12c is closed, the capacitor 15 is not charged so that the holding coil 16 will not be energized at all. As the starting coil 10 is energized, the motor 19 is rotated in the manner described hereinbefore. When the reduction gear 21 makes the rotation through the angle $\theta_1$, the reset switch 9 is closed so that the transistors 6 and 8 are turned off. The starting coil 10 is deenergized and the holding coil 16 remains deenergized so that the armature 32b is released from the core 35; that is, the pawl 32a returns the engageable position in which it engages with the side face of the gear 21. The motor switch 17 is therefore opened, but the phase switch 18 is closed so that the motor 19 is kept energized. Thereafter, at the 180° position (FIG. 7), the phase switch 18 is opened to deenergize the motor 19 and engagement of the pawl 32a and the second stop 28 stops the shutter driving mechanism in the open position. Thus even when the shutter release button B is kept depressed, no operation takes place so that the shutter may be kept opened. In like manner, even when the shutter release button B is released, the shutter is kept opened so that the film is kept exposed. When the release button is depressed again after it has been released, the reset switch 9 is opened at the phase angle at which the pawl 32a is in engagement with the second stop 28 as shown by (c) in FIG. 7 so that the capacitor 2 turns on the transistors 6 and 8 to energize the starting coil 10. The engagement of the pawl 32a with the second stop 28 is released so that the motor 19 and hence the reduction gear 21 rotates. Thereafter closure of the reset switch 9 as shown by (c) in FIG. 7 deenergizes the starting coil 10. The pawl 32a returns the engageable position, and the motor switch 17 is opened, but the phase switch 18 is closed so that the motor 19 may be kept energized. Thereafter, at the 360° position (FIG. 7), the motor 19 is deenergized by opening of the switch 18 in the manner described hereinbefore and engagement of the pawl 32a and the first stop 27 stops the shutter driving mechanism in the closed position. Thus the film is transported by one frame by the film transport mechanism (not shown). Then, even when the shutter release button B is kept depressed, the shutter is remained in the closed position as shown in FIG. 3. In like manner, even when the shutter release button B is released, the shutter is remained closed. Thus, every time when the release button B is depressed, the state shown in FIG. 3 is changed into the state shown in FIG. 4, and the state shown in FIG. 4 changes into the state shown in FIG. 3, so that the time exposure of one frame may be accomplished.

Next the automatic time mode will be described in which the switch 84 is closed. In this mode, the variable resistors 82 and 83 and the selection switch 81 take a part in the operation.

When the release button B is depressed under the conditions shown in FIGS. 2 and 3, the reduction gear 21 is rotated in the manner described hereinbefore so that the pawl 32a of the engaging lever engages with the second stop 28 and the shutter driving mechanism 20, 21, 22 is stopped. Therefore, the shutter is kept opened to expose the film. In response to the opening of the shutter, the movable contact 81a of the time constant selection switch 81 is made into the engagement with the stationary contact 81c as shown in FIG. 6. Therefore the starting capacitor 2 which has been discharged by the closure of the reset switch 9 is charged again through the variable resistor 82 and the switches 80 and 81 as the reset switch 9 is opened again. After a predetermined time, that is, when the voltage across the starting capacitor 2 exceeds the threshold voltage between the base and the emitter of the transistor 8, both the transistors 6 and 8 are turned on so that the starting coil 10 is energized. The pawl 32a is released from the second stop 28, and the reduction gear 21 is rotated so that the transistors 6 and 8 are turned off by the closure of the reset switch 9 and the starting capacitor 2 is discharged. The engaging lever 32 is returned the engageable position, and thereafter the phase switch 18 is open so that the motor 19 is deenergized. The shutter driving mechanism is stopped in the closed position when the pawl 32a engages with the first stop 27. Thus, the exposure is completed.

In response to the closing of the shutter, the movable contact or contact arm 81a of the time constant selection switch 81 closes the stationary contact 81b as shown in FIG. 5 so that when the reset switch 9 is opened the starting capacitor 2 is charged through the rest time setting variable resistor 83 and the switches 80 and 81. After a predetermined time; that is, when the voltage across the starting capacitor 2 exceeds the threshold voltage of the transistor 8, both the transistors 6 and 8 are turned on so that the starting coil 10 is energized. The pawl 32a of the engaging lever 32 is released from the first stop 27, and the motor 19 is driven in the manner described hereinbefore. When the pawl 32a engages with the second stop 28, the shutter driving mechanism is stopped to expose the film. The starting capacitor 2 is charged again through the variable resistor 82 in the manner described before, and the above description operation is cycled when the shutter release button B is kept depressed. Thus it is to be understood to carry out the automatic time photography which has an exposure time which is dependent upon the resistance of the exposure time setting resistor 82, the electrostatic capacitance of the starting capacitor and the threshold voltage of the transistor 8 and a rest interval which is dependent upon the resistance of the rest time setting resistor 83, the electrostatic capacitance of the starting capacitor 2, and the threshold voltage of the transistor 8. It is to be understood that when the resistance of the variable resistor 83 is made infinite, the automatic time exposure may be carried out with the rest time being manually controlled. In like manner, when the resistance of the variable resistor 82 is made infinite, the manually controlled time exposure may be carried out with the rest time being automatically controlled.

In a case where the phase switch 18 is eliminated the shutter driving mechanism 20, 21, 22 and the motor is so designed that the shutter driving mechanism may be driven by inertia of the mechanism and the motor to the position 360° (FIG. 7) when the motor 19 is deenergized through opening of the motor switch 17 following opening of the timing switch 14 in single-frame or continuous photography and that the mechanism may be driven by inertia of the motor 19 and the mechanism, caused by rotation, of the motor 19 during $\theta_1$, when the motor 19 is deenergized through closure of the reset switch 9 in the time photography.

Figure 8:
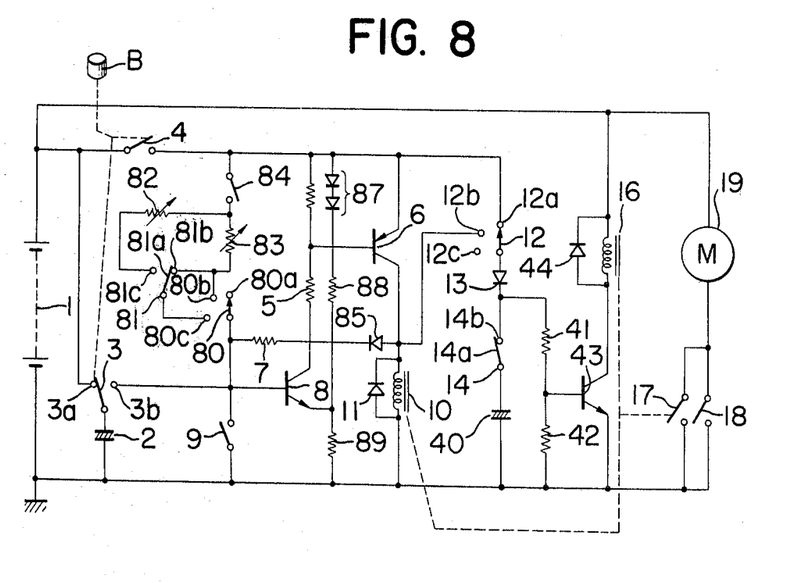
FIGS. 8, 9 and 10 are circuit diagrams of second, third and fourth embodiments, respectively, of the present invention.

The second embodiment shown in FIG. 8 has a distinct advantage that since the resistors 88 and 89 and diodes 87 are further inserted so that the rest time and exposure time in the automatic time exposure mode may be solely dependent upon the resistance of the variable resistors 82 and 83 independently of the voltage variation of the power supply 1 and the environmental temperature.

The anode of the diodes 87 is connected through the second trigger switch 4 to the positive terminal of the power supply 1 while the cathode is connected through the resistor 88 to the emitter of the transistor 8. The resistor 89 is interconnected between the emitter of the transistor 8 and the negative terminal of the power supply 1. The resistance $R_{88}$ and $R_{89}$ of the resistors 88 and 89 are so selected as to satisfy the following relation:

$$\frac{R_{88}}{R_{88} + R_{89}} = \frac{V_{BE}}{V_D}$$

where $V_D$: forward voltage of diodes 87: and $V_{BE}$: the voltage between the base and emitter of the transistor 8 when the latter is conducted.

Therefore the charging time, which is required to turn on the transistor 8 of the starting capacitor 2 which is charged through the charging circuit (82, 83 and 1) may be made independent of the voltage variation of the power supply 1 and the surrounding temperature. The method for deriving the above relation shall not be explained in this specification.

Since the emitter bias voltage is impressed upon the emitter of the transistor 8 through the diodes 87, and the resistors 88 and 89, the base potential at which the transistor 8 is turned on is increased. Therefore when the resistance of the resistor 82 or 83 and the capacitance of the starting capacitor 2 are selected equal to those of the first embodiment, both the exposure time and rest time in the automatic time exposure mode may be increased longer in the second embodiment as compared with the first embodiment.

In the second embodiment, it should be noted that the holding coil 16 is directly connected to the power supply 1 through a switching transistor 43. Series-connected resistors 41 and 42 are connected in parallel with a capacitor 40 through the timing switch 14. The junction between the resistors 41 and 42 is connected to the base of the switching transistor 43. The capacitor 40 has the same function with that of the capacitor 15 in the first embodiment.

Next the relationship among the capacitor 40, the resistors 41 and 42, and the transistor 43 will be described. In the first embodiment, the discharge current from the capacitor 15 is directly flown into the holding coil 16, but in the second embodiment the discharge current from the capacitor 40 flows through the timing switch 14 into the resistors 41 and 42, thereby turning on the transistor 43. Therefore the supply of the current to the holding coil 16 from the power supply 1 may be maintained. When the high resistance of the resistor 41 or 42 is selected, the capacitance of the capacitor 40 may be made smaller than that of the capacitor 15 in the first embodiment so that the second embodiment has another distinct advantage over the first embodiment that the capacitor 40 may be decreased in size.

Next the continuous exposure mode of the second embodiment will be described. When the release button B is depressed, the second trigger switch 4 is closed so that the two resistors 41 and 42 are connected to the power supply 1 so that the transistor 43 is turned on. The holding current flows through the holding coil 16 from the power supply through the switching transistor 43. Therefore, the continuous exposure mode is carried out as long as the release button B is kept depressed.

When the timing switch 14 is closed (at a phase angle except the phase angle $\theta_3$ shown in FIG. 5) and the release button B is released, the second trigger switch 4 is opened so that the supply of the current from the power source 1 to the resistors 41 and 42 is interrupted, but the discharge current from the capacitor 40 flows through the timing switch 14 into the resistors 41 and 42 so that the transistor 43 may be kept conducted. Therefore the holding current continues to flow into the holding coil 16 from the power supply 1. When the timing switch 14 is opened within the phase angle $\theta_3$, the discharge current from the capacitor 40 is interrupted so that the transistor 43 is turned off. The holding coil is deenergized, and thereafter, at the 360° position (FIG. 7), the phase switch 18 is opened to deenergize the motor 19 so that the shutter driving mechanism is stopped in the closed position by engagement of the pawl 32a and the stop 27.

When the release button B is released with the timing switch 14 being opened, neither the power supply 1 nor the capacitor 40 supplies the current to the resistors 41 and 42 so that the transistor 43 is immediately turned off. As a consequence, the holding coil 16 is deenergized. Thereafter, the phase switch 18 is opened so that the motor is stopped with the shutter closed.

Figure 9:
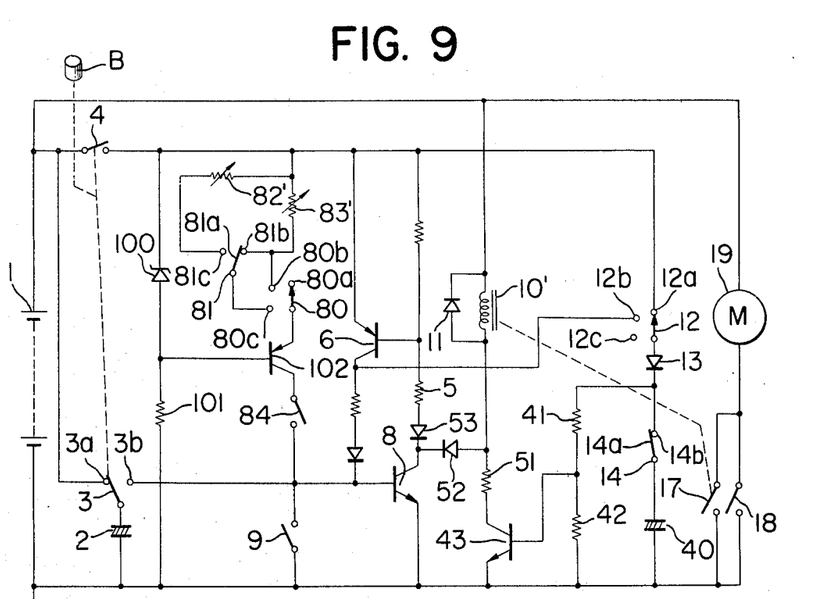

The third embodiment shown in FIG. 9 is different from the second embodiment in that the diodes 87, and the resistors 88 and 89 are eliminated and the starting capacitor 2 is charged through a constant current circuit so that the voltage variation of the power supply 1 will not adversely affect the rest time or exposure time in the automatic single frame exposure mode or the automatic time exposure mode.

Series-connected zener diode 100 and resistor 101 are connected in parallel with the power supply 1 through the second trigger switch 4, and the base of a transistor 102 is connected to the junction between the zener diode 100 and the resistor 101 while the emitter is connected through the selection switch 80 and the resistor 82' and 83' to the zener diode 100. The collector of the transistor 102 is connected through the switch 84 to the contact 3b of the first trigger switch 3. Thus the zener diode 100, the resistor 101, the variable resistor 82' or 83' and the transistor 102 make up a constant current circuit. The constant current circuit and the power supply 1 make up a charging circuit. In the automatic single frame exposure mode or in the automatic time exposure mode (in which the switch 84 is closed and the contact 80b or 80c of the selection switch 80 is closed), the starting capacitor 2 is charged with the constant current, regardless of the voltage variation of the power supply 1, supplied from the collector of the transistor 102 through the switch 84 and the closed contact 3b of the first trigger switch 3 as long as the reset switch 9 is kept opened. The magnitude of the constant current is determined by the resistance of the resistor connected to the emitter of the transistor 102 so that the charging time of the starting capacitor 2; that is the rest time or exposure time may be suitably adjusted by adjusting the variable resistor 82' and 83'.

Opposed to the first and second embodiments wherein the starting coil 10 and the holding coil 16 are employed, in the third embodiment the coil 10' which functions not only as a starting coil but also as a holding coil and a current limiting resistor 51 are employed.

Since only one coil is employed in the third embodiment, the electromagnet with a less volume may be used.

Next the improvements of the third embodiment over the first, and second embodiments will be described. One end of the starting-holding coil 10' is connected to the positive terminal of the power supply while the other end, to the collector of the switching transistor 43 through the current limiting resistor 51. The emitter of the transistor 43 is connected to the negative terminal of the power supply 1. The holding current flows from the power supply 1 through the current limiting resistor 51 and the transistor 43 into the starting-holding coil 10' as long as the transistor 43 is kept turned on. The anode of a diode 52, which is inserted in order to prevent the reverse current, is connected to the junction between the coil 10' and the current limiting resistor 51 while the cathode, to the collector of the transistor 8. The starting current flows from the power supply 1 through the diode 52 and the transistor 8 into the starting-holding coil 10'. The mode of operation is substantially similar to that of the first embodiment so that further description shall not be made.

Figure 10:
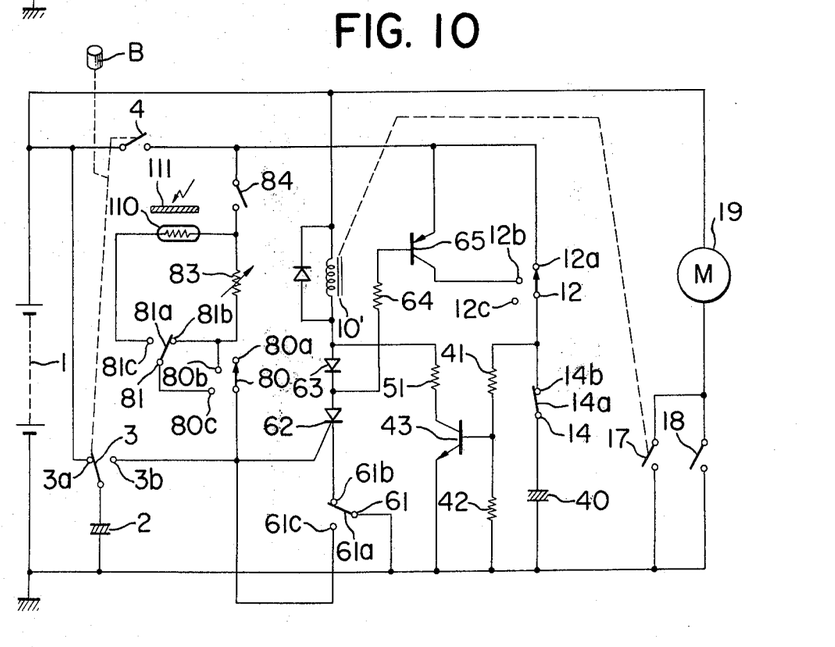

In the fourth embodiment shown in FIG. 10, instead of the variable resistor 82 or 82' used in the first, second and third embodiments, a photoelectric cell 110 is used in order to attain the optimum exposure in case of the automatic time exposure mode. As with the case of the third embodiment (See FIG. 9), the starting-holding coil 10' is used, but instead of the transistors 6 and 8, an SCR is used in order to switch the starting current.

The one end of the starting-holding coil 10' is connected to the positive terminal of the power supply 1 while the other end, to the anode of the SCR 62 through a diode 63, which is inserted in order to prevent the reverse current. The cathode of the SCR 62 is connected to the stationary contact 61b of the reset switch 61 while the gate to the stationary contact 3b of the first trigger switch 3 and to the stationary contact 61c of the reset switch 61. In order to reset or drive the SCR 62 from the conduction state into the non-conduction state, the reset switch 61 is interconnected between the cathode of the SCR 62 and the negative terminal of the power supply 1. The reset switch 61 has stationary contacts 61b and 61c and a movable contact 61a connected to the negative terminal of the power supply 1 so that the starting capacitor 2 may have its both ends short-circuited so as to be discharged rapidly.

The emitter of a transistor 65 which is inserted in order to charge the capacitor 40 in the single frame exposure mode, is connected through the second trigger switch 4 to the positive terminal of the power supply while the collector, to the single frame exposure contact 12b, and the base, to the junction between a diode 63 and the SCR 62 through a resistor 64. As with the case of the third embodiment shown in FIG. 9, the switching transistor 43 has a function of switching the holding current which flows into the starting-holding coil 10' through the resistor 51.

Figure 11:
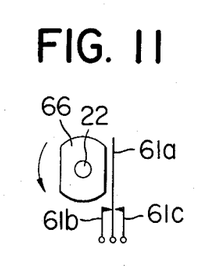
FIGS. 11 and 12 are views used for the explanation of the mode of operation of a reset switch in the fourth embodiment shown in FIG. 10.
Figure 12:
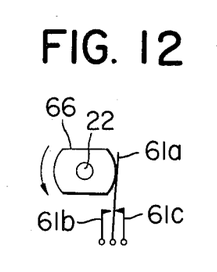

The arrangement and mode of operation of the reset switch 61 may be best understood with reference to FIGS. 11 and 12. Instead of the reset switch 9 in the first embodiment shown in FIG. 2, a cam 66 made of an insulating material is attached to the main driving shaft 22 for rotation in unison therewith. The movable contact or contact arm 61a made of a resilient material is made into contact with the stationary contact 61b when the former is moved away from the cam 66, but is made into contact with the stationary contact 61c when the contact arm 61a is made into engagement with the cam 66. In the interruption mode of the shutter driving mechanism shown in FIG. 3 or 4, the movable contact or contact arm 61a is made into contact with the stationary contact 61b as shown in FIG. 11, but when the motor 19 is driving, the contact arm 61a is made into engagement with the stationary contact 61c as the former engages with the raised arcuate cam surface of the cam 66.

A photoelectric cell such as a CdS 110 is placed so as to intercept the light passing through light quantity control means 11 such as a filter or stop. The light quantity control means 111 is adjusted depending upon the speed of the film to be used or the aperture of an objective lens used so that the quantity of light intercepted by the CdS 110 may be suitably controlled.

The operation in the continuous exposure mode, the single frame exposure mode and the manual time exposure mode is substantially similar to that of the first embodiment so that only the operation in the automatic time exposure mode will be described hereinafter.

In the automatic time exposure mode, the contact 80c of the mode selection switch 80 and the contact 12c of the switch 12 are closed. When the shutter release button B is depressed with the switch 84 being closed, the motor 19 rotates and then is stopped after the pawl 32a has been made into engagement with the second stop 28 in a manner substantially similar to that described hereinbefore. Therefore the shutter is kept opened as shown in FIG. 4 so that the film is exposed. The movable contact 81a of the switch 81 is made into contact with the stationary contact 81c as shown in FIG. 6 by the cam 86 so that the starting capacitor 2 is charged with the charging current which is dependent upon the resistance of the CdS 110 which in turn is dependent upon the brightness of the subject. As the voltage across the starting capacitor 2 rises, the SCR 62 is conducted so that the motor 19 is energized. Therefore the shutter is closed, and the shutter driving mechanism and the motor 19 is stopped when the pawl 32a engages with the first stop 27 (See FIG. 3). Then, the movable contact 81a of the switch 81 closes the contact 81b (See FIG. 5) so that the starting capacitor 2 is charged with the charging current which is dependent upon the resistance value of the variable resistor 83. After a predetermined time, the SCR 62 is conducted, and the motor 19 is driven again so that the shutter is opened again. Thus, as long as the release button B is kept depressed, the above operation is cycled; that is the automatic time exposure is carried on.

As is clear from the foregoing description, the exposure time is determined by the charging current which in turn is controlled by the CdS 110. Therefore when the CdS 110 with its gamma ($\gamma$) characteristic substantially equal to unity is selected, and the relation between the capacitance of the starting capacitor 2 and the threshold voltage of the SCR 62 is suitably selected, the optimum exposure time may be always automatically determined.

Figure 13:
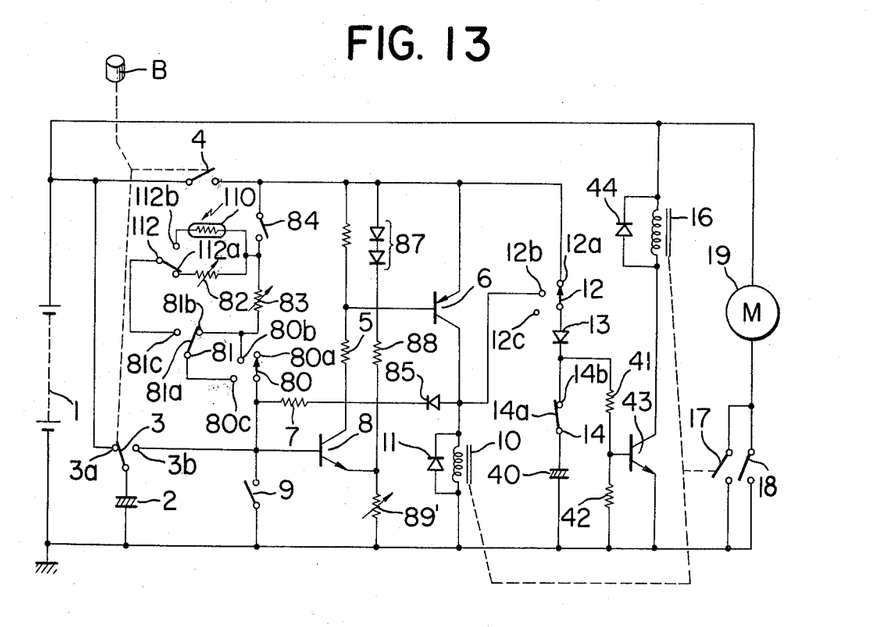
FIG. 13 is a circuit diagram of a fifth embodiment of the present invention.

In the fifth embodiment shown in FIG. 13, not only the exposure time may be automatically or manually controlled, but also the exposure factor such as an aperture or film speed may be entered into the circuit by varying the resistance of the variable resistor.

One end or terminal of the manual exposure time setting variable resistor 82 and the CdS for automatically setting the optimum exposure time is connected to the switch 84 while their other terminals are connected to the stationary terminals 112a and 112b, respectively, of a switch 112, which may be actuated from the exterior for selecting the automatic or manual exposure time setting. When the manual exposure time setting is desired, the contact 112a is closed while the contact 112b is closed when the automatic exposure time setting is desired.

A variable resistor 89' which is interconnected between the emitter of the transistor 6 and the negative terminal of the power supply 1 is used for entering the exposure factor. That is, the emitter potential of the transistor 8 is varied in response to the set value of the variable resistor 89' so that the voltage across the starting capacitor for turning on the transistor 8 may be varied. Therefore, the time required for the starting capacitor 2 to be charged to a voltage at which the transistor 8 is conducted; that is, the exposure time may be varied by setting the variable resistor 89' depending upon the exposure factor.

The mode of operation when the contact 112a of the switch 112 is closed is substantially similar to that of the second embodiment shown in FIG. 8. The mode of operation when the contacts 112b is closed is substantially similar to that of the fourth embodiment shown in FIG. 10.

In the preferred embodiments of the present invention described above, the starting capacitor 2, which is charged by the charging circuit consisting of the variable resistors 82 and 83 or the constant current circuit and the power supply 1 in the automatic single frame exposure mode or the time exposure mode, is started to be charged immediately when the reset switch 9 is opened or when the contact 61b of the reset switch 61 is closed. However, it suffices that the starting of the charging of the starting capacitor 2 may be only after the SCR 62 or transistors 6 and 8 are turned off so that it is not necessary to start the charging immediately when the reset switch 9 is opened. That is, the charging may be started in a predetermined time after the reset switch 9 has been opened.

So far the positive feedback circuit consisting of the transistor 6 and 8 or the bistable circuit such as SCR 62 has been described as a switching circuit for the starting coil 10 or 10', but it is to be understood that the present invention is not limited thereto. Any switching circuit, which is turned on in response to the discharge of the starting capacitor 2 and is turned off when the reset switch 9 or 61 is closed or opened, may be used.

So far the engaging lever 32 and two stops 27 and 28 are used in order to stop the shutter driving mechanism as the predetermined positions, but one of the two stops 27 and 28 may be eliminated when another driving lever, which is likewise actuated by the electromagnet 10 and 16, is disposed in diametrically opposed relation with the lever 32 so as to engage with the remaining stop.

In the preferred embodiments described above, the capacitor 15 or 40 and the timing switch 14 are provided in order to prevent the engagement of the engaging lever 32 with the second stop 28 for stopping the shutter at the opened position in the continuous exposure mode and the single frame exposure mode, but any other suitable mechanical mechanism may be used. For instance, there may be provided a mechanical means which, when the continuous exposure mode or the single frame exposure mode is selected by the selection switch 12 or 80, may retract the second stop 28 from the side surface of the gear 21 so that the second stop 28 may be prevented from engaging with the lever 32 even when the engaging lever 32 is released from the electromagnet.

As described hereinbefore, according to the present invention, the exposure time and the rest time may be manually suitably selected in the manual time exposure mode, and in the automatic exposure mode, the exposure time as well as the rest time are determined by the charging time of the starting capacitor without using any mechanical moving member so that the trigger device may be made compact in size. Futhermore the charging time is dependent upon the value of the resistor or resistors associated with the starting capacitor so that the exposure time and the rest time may be selected over a wide range.

I claim:
1. An electromagnetic trigger device for use with a camera of the type capable of automatic time exposure comprising:
   a. a power supply;
   b. a motor;
   c. a trigger switch;
   d. shutter driving means driven by said motor for driving a shutter and movable between a fully closed position and a fully open position, said shutter driving means fully opening the shutter when it is at the fully open position and fully closing the shutter when it is at the fully closed position;
   e. engaging means movable between a latching position and a non-latching position, said engaging means being adapted, when moved to said latching position, to latch said shutter driving means which occupies the fully open or fully closed position;
   f. a motor switch which is closed for electrically connecting said motor to said power supply, when said engaging means is in said non-latching position;
   g. a starting coil for attracting said engaging means, when energized, to move said engaging means to said non-latching position;
   h. a switching circuit for connecting said starting coil to said power supply when turned on;
   i. a starting capacitor connected to said power supply so as to be charged when said trigger switch is opened and connected to said switching circuit to render said circuit conductive when said trigger switch is closed;
   j. reset means for rendering said switching circuit non-conductive for a predetermined period during an interval beginning with the closing operation of said trigger switch, said predetermined period being shorter than the shorter of the time interval required for said shutter driving means to move from the fully closed position to the fully open position and the time interval required for said driving means to move from the fully open position to the fully closed position; and
   k. a charging circuit interlocked with said shutter driving means for charging said starting capacitor connected to said switching circuit to thereby render said switching circuit conductive when said shutter driving means is in the fully open position, whereby conduction of the switching circuit by the charge of said starting capacitor through said charging circuit energizes said starting coil and then said motor to move the shutter driving means from the fully open position to the fully closed position.

2. An electromagnetic trigger device as defined in claim 1, further comprising:
a phase switch parallel-connected to said motor switch, said phase switch being operatively associated with said shutter driving means so as to be opened when said shutter driving means is in the fully open or closed position, and wherein said charging circuit is connected to said starting capacitor by said shutter driving means while said shutter driving means is moved from the fully closed position to the fully open position.

3. An electromagnetic trigger device as defined in claim 1, wherein said charging circuit comprises:
a first resistor; and
switching means interlocked with said shutter driving means for connecting said first resistor to said starting capacitor when said shutter driving means is in the fully open position.

4. An electromagnetic trigger device as defined in claim 3, wherein said first resistor is variable resistor.

5. An electromagnetic trigger device as defined in claim 3, wherein said first resistor is a photoelectric cell.

6. An electromagnetic trigger device as defined in claim 1, wherein said charging circuit comprises:
a constant current supply means; and
switching means interlocked with said shutter driving means for connecting said constant current supply means to said starting capacitor so as to charge the latter with the constant current when said shutter driving means is in the fully opened position.

7. An electromagnetic trigger device as defined in claim 1, wherein said reset means comprises:
a switch connected in parallel with said starting capacitor, which in turn is connected to said switching circuit, in such a way that said switch may turn off said switching circuit while short-circuiting said starting capacitor.

8. An electromagnetic trigger device as defined in claim 1, further comprising:
a selector member for continuous photography and time photography;
a holding coil energized to hold said engaging means in the non-latching position when continuous photography is selected and when said trigger switch is closed; and
first means interlocked with said selector member for preventing said engaging means from latching said shutter driving means which occupies the fully open position when said selector member selects continuous photography.

9. An electromagnetic trigger device as defined in claim 8 wherein said first means includes a current generating circuit having a timing switch,
said timing switch being interlocked with said shutter driving means to be opened for a part of a time interval required for said shutter driving means to move from the fully open position to the fully closed position,
said current generating circuit flowing a current through said timing switch to maintain said holding coil energized and hold said engaging means in the non-latching position when said trigger switch is open in continuous photography.

10. An electromagnetic trigger device as defined in claim 9 wherein said timing switch is opened when said shutter driving means is in the fully open position, and the remaining part of said time interval is longer than at least the time interval required for said engaging means to move from the non-latching position to the latching position.

11. An electromagnetic trigger device according to claim 9, wherein said shutter driving means is rotated by said motor and wherein said engaging means includes an engaging member movable between said latching position and said non-latching position by the attraction of said starting coil, and first and second engaging elements rotatable with said shutter driving means, said engaging member being, when in said latching position, engageable with said first or said second engaging elements to latch said shutter driving means in the fully open position or in fully closed shutter position.

12. An electromagnetic trigger device according to claim 11, wherein said first and second engaging elements are provided on a rotatable member secured to said shutter driving means and making a complete rotation for one exposure, said two engaging members being positioned substantially symmetrically about the axis of rotation of said rotatable member.

13. An electromagnetic trigger device according to claim 12, wherein said engaging means has bias means for biasing said engaging members to said latching position.

14. An electromagnetic trigger device according to claim 8, wherein said selector member includes a switch adapted, when continuous photography is selected, to connect said holding coil to said power source through said trigger switch.

15. An electromagnetic trigger device according to claim 9, wherein said current generating circuit further includes a capacitor series-connected to said timing switch, said capacitor being chargeable through said trigger switch and dischargeable through said timing switch upon opening of said trigger switch.

16. An electromagnetic trigger device according to claim 15, wherein said capacitor is parallel-connected to said holding coil through said timing switch and the discharge current therefrom energizes said holding coil.

17. An electromagnetic trigger device according to claim 15, further comprising:
switch means connected between said holding coil and said power source; and
control means parallel-connected to said capacitor through said timing switch to control said switch means, said control means being operable by the discharge current from said capacitor to render said switch means conductive.

18. An electromagnetic trigger device according to claim 16, wherein said control means, when said selector member selects continuous photography and said trigger switch is closed, is operable by the current from said power source to render said switch means conductive.

19. An electromagnetic trigger device according to claim 18, wherein said switch means is a transistor and said control means is a resistor for imparting a bias voltage to the base of said transistor.

20. An electromagnetic trigger device according to claim 8, wherein said holding coil and said starting coil are provided by a common coil, and said common coil, when acting as the holding coil, is supplied with power through a current restraining resistor.

21. An electromagnetic trigger device as defined in claim 1, wherein said switching circuit is a bistable circuit.

22. An electromagnetic trigger device as defined in claim 1, further comprising a second charging circuit interlocked with said shutter driving means so as to be connected to said starting capacitor while said shutter driving means is moved from the fully open position to the fully closed position, for charging the starting capacitor connected to said switching circuit to thereby render said switching circuit conductive when the shutter driving means is in the fully closed position.

23. An electromagnetic trigger device as defined in claim 6, further comprising switching means for selectively connecting said starting capacitor to said first-mentioned charging circuit or said second charging circuit.

24. In a camera of the type having a shutter movable between closed and open positions repetitively, having shutter drive means for moving said shutter when energized, having a switching circuit for energizing said drive means when the switching circuit is triggered, having a starting capacitor adapted to be charged from a power supply and to trigger said switching circuit when the capacitor is sufficiently charged and connected to said switching circuit, and having a trigger switch closed for connecting said capacitor to said switching circuit, the improvement comprising means for charging said starting capacitor when said trigger switch is closed and said shutter is in its open position for thereby controlling the length of exposure.

25. The invention of claim 24, further comprising means for charging said starting capacitor when said trigger switch is closed and said shutter is in its closed position thereby controlling the length of the rest time between exposures.

26. The invention of claim 25, wherein each of said charging means is interlocked with said shutter drive means so as to be rendered operative or inoperative depending upon the position of the shutter.

27. In a camera of the type having a shutter movable between closed and open positions repetitively, having shutter drive means for moving said shutter when energized, having a switching circuit for energizing said drive means when the switching circuit is triggered, having a starting capacitor adapted to be charged from a power supply and to trigger said switching circuit when the capacitor is sufficiently charged and connected to said switching circuit, and having a trigger switch closed for connecting said capacitor to said switching circuit, the improvement comprising means for charging said starting capacitor when said trigger switch is closed and said shutter is in its closed position for thereby controlling the rest time between exposures.

* * * * *